US008799069B2

(12) United States Patent
Gupta et al.

(10) Patent No.: US 8,799,069 B2
(45) Date of Patent: Aug. 5, 2014

(54) MOBILE CLICK FRAUD PREVENTION

(75) Inventors: Arvind Gupta, San Carlos, CA (US); Ashutosh Tiwari, Studio City, CA (US); Gopalakrishnan Venkatraman, Campbell, CA (US); Dominic Cheung, South Pasadena, CA (US); Stacy R. Bennett, Pasadena, CA (US); Douglas B. Koen, Austin, TX (US)

(73) Assignee: Yahoo! Inc., Sunnyvale, CA (US)

( * ) Notice: Subject to any disclaimer, the term of this patent is extended or adjusted under 35 U.S.C. 154(b) by 1593 days.

(21) Appl. No.: 11/963,165

(22) Filed: Dec. 21, 2007

(65) Prior Publication Data
US 2009/0164269 A1    Jun. 25, 2009

(51) Int. Cl.
*G06Q 30/00*    (2012.01)

(52) U.S. Cl.
USPC ........................ 705/14.45; 705/14.47; 705/7

(58) Field of Classification Search
USPC ........................................... 705/14.45, 14.47
See application file for complete search history.

(56) References Cited

U.S. PATENT DOCUMENTS

| | | | | |
|---|---|---|---|---|
| 6,009,409 A | 12/1999 | Adler et al. | | 705/14 |
| 6,026,368 A | 2/2000 | Brown et al. | | 705/14 |
| 6,199,045 B1 | 3/2001 | Giniger et al. | | 705/1 |
| 6,343,317 B1 | 1/2002 | Glorikian | | 709/217 |
| 6,377,793 B1 | 4/2002 | Jenkins | | 455/456 |
| 6,401,075 B1 | 6/2002 | Mason et al. | | 705/14 |
| 6,480,713 B2 | 11/2002 | Jenkins | | 455/456 |
| 6,654,725 B1 | 11/2003 | Langheinrich et al. | | 705/14 |
| 6,681,107 B2 | 1/2004 | Jenkins et al. | | 455/412.1 |
| 6,714,975 B1 | 3/2004 | Aggarwal et al. | | 709/224 |
| 6,826,572 B2 | 11/2004 | Colace et al. | | 707/10 |
| 6,907,566 B1 | 6/2005 | McElfresh et al. | | 715/517 |
| 6,928,615 B1 | 8/2005 | Haitsuka et al. | | 345/340 |
| 6,985,742 B1 | 1/2006 | Giniger et al. | | 455/414.3 |
| 7,043,483 B2 | 5/2006 | Colace et al. | | 707/3 |
| 7,363,024 B2 | 4/2008 | Jenkins | | 455/412.1 |
| 2002/0046259 A1 | 4/2002 | Glorikian | | |
| 2002/0073034 A1 | 6/2002 | Wagner et al. | | 705/51 |
| 2002/0078101 A1 | 6/2002 | Chang et al. | | 707/516 |
| 2003/0046161 A1 | 3/2003 | Kamangar et al. | | 705/14 |
| 2003/0149938 A1 | 8/2003 | McElfresh et al. | | 715/517 |
| 2004/0039733 A1 | 2/2004 | Soulanille | | 707/3 |
| 2004/0054576 A1 | 3/2004 | Kanerva et al. | | 709/206 |
| 2004/0093327 A1 | 5/2004 | Anderson et al. | | 707/1 |
| 2004/0186776 A1 | 9/2004 | Llach | | 709/200 |

(Continued)

FOREIGN PATENT DOCUMENTS

KR    100703567 B1    4/2007    ............. G06F 15/00

OTHER PUBLICATIONS

International Search Report issued in International Application No. PCT/US2008/084489, dated May 27, 2009, 2 pages.

(Continued)

*Primary Examiner* — John Van Bramer
*Assistant Examiner* — Stacie Gatling
(74) *Attorney, Agent, or Firm* — Brinks Gilson & Lione

(57) ABSTRACT

A system is disclosed for detecting and handling click fraud in a mobile environment. The system may identify a source of a request. The request may be handled differently based on whether the source of the request originated from mobile traffic or web traffic. The source of the request may be used to determine whether a request is valid or invalid. The request may be flagged if the request is invalid.

16 Claims, 9 Drawing Sheets

(56) References Cited

U.S. PATENT DOCUMENTS

| | | | |
|---|---|---|---|
| 2005/0010477 A1 | 1/2005 | Sullivan et al. | 705/10 |
| 2005/0154746 A1 | 7/2005 | Liu et al. | 707/5 |
| 2005/0174975 A1 | 8/2005 | Mgrdechian et al. | 370/338 |
| 2006/0085419 A1 | 4/2006 | Rosen et al. | 705/1 |
| 2006/0149630 A1 | 7/2006 | Elliott et al. | 705/14 |
| 2006/0172697 A1 | 8/2006 | Gallego et al. | 455/522 |
| 2006/0194572 A1 | 8/2006 | Fresonke et al. | 455/414.1 |
| 2006/0194595 A1 | 8/2006 | Myllynen et al. | 455/412.2 |
| 2006/0282888 A1 | 12/2006 | Bandini et al. | 726/14 |
| 2007/0050371 A1 | 3/2007 | Johnson et al. | 707/10 |
| 2007/0061211 A1* | 3/2007 | Ramer et al. | 705/25 |
| 2007/0174490 A1 | 7/2007 | Choi et al. | 709/246 |
| 2007/0192190 A1* | 8/2007 | Granville | 705/14 |
| 2008/0059300 A1* | 3/2008 | Hamoui | 705/14 |

OTHER PUBLICATIONS

Written Opinion of the International Searching Authority in International Application No. PCT/US2008/084489, dated May 27, 2009, 4 pages.

"CTIA: Smaato Introduces New Mobile Ad Solutions for Carriers: Advertising Delivery Support for Java Phones, Smartphones & Mobile Web; Launch of New Version of SOMA Mobile Advertising Platform," CTIA—San Francisco Moscone Center, Booth # 108, Oct. 23-25, 2007, 2 pages. Retrieved from http://www.smaato.com/download/pressarea/Smaato_CTIA_20071022_release.pdf.

"Strong Partners for Effective Mobile Advertising: Adconion Media Group and Smaato Enter Strategic Partnership," San Mateo / Munich, Germany—May 9, 2007, 2 pages. Retrieved from http://www.smaato.com/download/pressarea/Smaato_AMD_20070503_release.pdf.

"Smaato—Media / Developers," pp. 1-2, http://www.smaato.com/mo_mediadev.php, available at least as of Jan. 3, 2008.

"Smaato—Mobile Carriers," pp. 1-2, http://www.smaato.com/mo_carriers.php, available as least as of Jan. 3, 2008.

"Smaato—Mobile Marketing," pp. 1-2, http://www.smaato.com/mobile.php, available at least as of Jan. 3, 2008.

"ESME," *Wikipedia, the free encyclopedia*, p. 1, http://en.wikipedia.org/wiki/ESME, last modified Dec. 20, 2006, last visited Oct. 9, 2007.

"Network Switching Subsystem," *Wikipedia, the free encyclopedia*, pp. 1-6, http://en.wikipedia.org/wiki/Network_Switching_Subsystem, last modified Oct. 9, 2007, last visited Oct. 9, 2007.

"Short message service," *Wikipedia, the free encyclopedia*, pp. 1-5, http://en.wikipedia.org/wiki/Short_message_service, last modified Oct. 9, 2007, last visited Oct. 9, 2007.

"Short message service center," *Wikipedia, the free encyclopedia*, pp. 1-2, http://en.wikipedia.org/wiki/Short_message_service_center, last modified Sep. 11, 2007, last visited Oct. 9, 2007.

"Signal Transfer Point," Wikipedia, the free encyclopedia, p. 1, http://en.wikipedia.org/wiki/Signal_transfer_point, last modified Aug. 16, 2007, last visited Oct. 9, 2007.

"My First 6 Yahoo Panama 'Enhancement' Requests [Archive]", *Search Engine Watch Forums*, pp. 1-2, http://forums.searchenginewatch.com/archive/index.php/t-15882.html, containing posts from Jan. 18, 2007 to Jan. 25, 2007, last visited Apr. 23, 2008.

"Limbo Offers Purina Pet Lodown," *Adweek*, pp. 1-2, http://www.adweek.com/aw/iq_interactive/article_display.jsp?vnu_content_id=1003665626, dated Oct. 21, 2007, last visited Apr. 1, 2008.

International Preliminary Report on Patentability from corresponding International Application No. PCT/US2008/084489, dated Jul. 2010, 8pp.

Taiwanese Office Action from corresponding Taiwanese Patent Application No. 97145066, 20pgs., dated Oct. 15, 2012.

* cited by examiner

MOBILE CLICK FRAUD PREVENTION

TECHNICAL FIELD

The present invention relates generally to fraud protection and, more particularly, but not exclusively, to click-fraud detection and handling in a mobile environment.

BACKGROUND OF THE INVENTION

An increase in information, products, and services offered through the Internet, as well as dramatic growth in the number and types of consumers using the Internet, has led to a dramatic growth in advertisers promoting their goods and services through the Internet. Advertisers may pay publishers to host or sponsor their advertisements on Web pages, search engines, browsers, or other online media. Additionally, the emergence of wireless technologies may be creating unique opportunities for wireless carriers, advertisers, and publishers to generate additional revenue streams through new and existing mobile phone customers.

Publishers may charge the advertisers on a "per click" basis, meaning the publishers may charge the advertisers each time one of their advertisements is clicked-on by a user viewing the advertisement. The "per click" payment method, however, may be susceptible to click fraud. Click fraud occurs when a non-legitimate click is entered or detected. For example, a script or other software agent may be configured to repeatedly click on an advertisement, artificially driving up the per-click payments and resulting in an advertiser being charged for a large number of fraudulent clicks that were not entered by a legitimate user.

To address the potential for click fraud, click-based advertisement models may employ click fraud detection systems to identify "valid" or legitimate clicks. The publisher may then only charge the advertiser for the valid clicks. One such system has been disclosed in U.S. patent application Ser. No. 11/789,729 filed Apr. 25, 2007, entitled "System for Scoring Click Traffic." Other click fraud detection models may be designed to recognize excessive clicks originating from a single internet protocol (IP) address. These click fraud detection systems are directed to online, web-based click fraud schemes.

Existing click fraud detection models developed for online, wire-based systems may not be adequate for the wireless carrier environment. For example, a click fraud detection model based on excessive clicks from a single IP address may inappropriately flag as invalid a mobile carrier's IP gateway where the gateway routes a multitude of mobile device users through a single, finite, or limited number of IP addresses.

BRIEF SUMMARY

A system is disclosed for detecting and handling click fraud in a mobile network carrier environment. The disclosed system may identify the source of a request. The system may handle the request as web traffic or as mobile traffic. The system may determine whether the source of the request is valid or invalid. The system also may flag the request as invalid.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF THE DRAWINGS AND THE PRESENTLY PREFERRED EMBODIMENTS

A system and method, generally referred to as a system, relate generally to click fraud handling and detection in a mobile environment. The principles described herein may be embodied in many different forms. The disclosed systems and methods may allow publishers and/or advertisers to effectively identify untrustworthy or invalid clicks and/or trustworthy or valid clicks. For the sake of explanation, the system is described as used in a network environment, but the system may also operate outside of the network environment.

Figure 1:
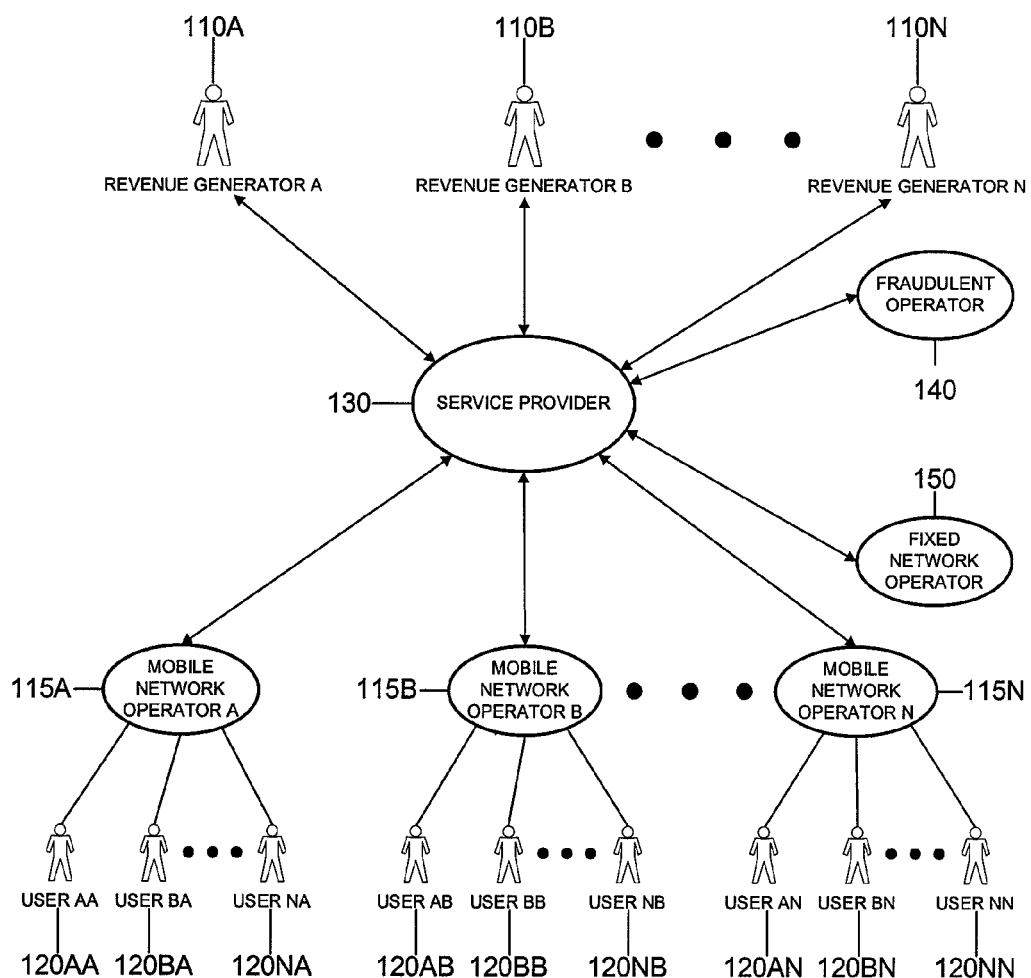
FIG. 1 is a block diagram of a general overview of a system for detecting and handling click fraud in a mobile environment.

FIG. 1 provides a general overview of a system 100 for serving advertisements over mobile devices. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more revenue generators 110A, 110B, . . . 110N, generally referred to as the revenue generators 110A-N, such as mobile advertisers, a service provider 130, such as a portal, one or more mobile network operators ("MNOs") 115A, 115B . . . 115N, generally referred to as the MNOs 115A-N, more commonly referred to as mobile carriers or simply carriers, and one or } more users 120AA, 120BA, ... 120NA, 120BA, 120BB, ... 120BN, ... 120AN, 120BN, ... 120NN, generally referred to as the users 120AA-NN, such as mobile subscribers or consumers. The revenue generators 110A-N may pay the service provider 130 to display advertisements, such as online advertisements on a network such as a mobile network or the Internet. The users 120AA-NN may access the advertisements hosted by the service provider 130 through a Web page, search engine, or other online publishing media. The advertisements may be presented by a browser, such as a web browser or mobile web browser. The payments may be based on various factors, such as the number of times an advertisement may be displayed to the users 120AA-NN and/or the number of times one of the users 120AA-NN may click through the advertisement to the revenue generator's web site or mobile site.

The service provider 130 may maintain a mobile site or mobile portal, such as a search site, where the service provider 130 may display advertisements of the revenue generators 110A-N to the users 120AA-NN. The service provider 130 may also display advertising content provided by the revenue generators 110A-N in response to a search query from one of the users 120AA-NN. The service provider 130 may share revenue with the MNOs 115A-N for displaying advertisements of the revenue generators 110A-N on their mobile networks. Alternatively or in addition the service provider 130 may share revenue with individual mobile publishers for displaying advertisements of the revenue generators 110A-N on their mobile sites. Access to the mobile portal may not be limited to the users 120AA-NN, but may also be available to a fraudulent operator 140 or users of a fixed network operator 150.

The users 120AA-NN may be consumers of goods or services who may be searching for a business such as the business of one of the revenue generators 110A-N. The users 120AA-NN may communicate with the service provider 130 through the mobile network operators 115A-N. The users 120AA-NN may supply information describing themselves to the service provider 130, such as the location, gender, or age of the users 120AA-NN, or generally any information that may be required for the users 120AA-NN to utilize the services provided by the service provider 130. Alternatively or in addition the service provider 130 may obtain information about the users 120AA-NN from the MNOs 115A-N. Any of the information obtained by the service provider 130 may be in the form of hidden information, such as cookie data, mobile identification parameters, or service provider-provided information.

The users 120AA-NN may search, browse, or otherwise access content, including advertising content, provided by the service provider 130 through the mobile network operators 115A-N. Selections, clicks on advertisements, or searches may not be valid or authentic. A search, a click, or a series of searches or multiple clicks on the same advertisement may originate from an automated script, such as a script associated with the fraudulent operator 140, rather than from potential customers such as the users 120AA-NN. The searches or clicks may originate from an automated script designed to "spoof" or fraudulently imitate an IP address associated with one of the MNOs 115A-N. Alternatively or in addition the searches or clicks may originate from a user associated with the fixed network operator 150.

In the system 100, the revenue generators 110A-N may interact with the service provider 130, such as via a web application. The revenue generators 110A-N may send information, such as billing, website or mobile site and advertisement information, to the service provider 130 via the web application. The web application may include a web browser or other application such as any application capable of displaying web content. The application may be implemented with a processor such as a personal computer, personal digital assistant, mobile phone, or any other machine capable of implementing a web application.

The users 120AA-NN may also interact individually with the service provider 130, through the mobile network operators 115A-N, such as via a mobile phone or any device capable of communicating with the mobile network operators 115A-N. The users 120AA-NN may interact with the service provider 130 via a mobile web based application, a mobile standalone application, or any application capable of running on a mobile device. The service provider 130 may communicate data to the revenue generators 110A-N over a network and to the users 120AA-NN over a network via the MNOs 115A-N. The following examples may refer to a revenue generator A 110A as an online advertiser or mobile advertiser; however the system 100 may apply to any revenue generators 110A-N who may desire to serve advertisements over mobile devices.

In operation, one of the revenue generators 110A-N, such as revenue generator A 110A, may provide information to the service provider 130. This information may relate to the transaction taking place between the revenue generator A 110A and the service provider 130, or may relate to an account the revenue generator A 110A maintains with the service provider 130. In the case of a revenue generator A 110A who is a mobile advertiser, the revenue generator A 110A may provide initial information necessary to open an account with the service provider 130.

A revenue generator A 110A who is a mobile advertiser may maintain one or more accounts with the service provider 130. For each account the revenue generator A 110A may maintain one or more advertisement campaigns. For each campaign the revenue generator A 110A may maintain one or more listings. A listing may include a search keyword and one or more carrier listings. Each carrier listing may identify the mobile carrier and may include an advertisement title, an advertisement description, a bid amount and a mobile site URL, if any. A carrier listing may represent an association between a search keyword, a mobile advertisement and a carrier whose users are targeted by the mobile advertisement. Alternatively or in addition a carrier listing may represent an association between a mobile advertisement and a mobile device whose users are targeted by the mobile advertisement.

The carrier listings may allow the service provider 130 to provide a mobile advertising marketplace separate from the web advertising marketplace, essentially separating the web keywords from the mobile keywords. The carrier listings may also allow the service provider 130 to provide a separate marketplace for each of the MNOs 115A-N, essentially separating the keywords associated with each of the MNOs 115A-N. For example, the revenue generator A 110A may place one bid on the keyword "dvd" for the MNO A 115A and a separate bid for the keyword "dvd" for the MNO B 115B. Furthermore, by creating a separate marketplace for each of the MNOs 115A-N, the revenue generator A 110A may create separate advertisements compatible with the underlying technology of each MNO.

The service provider 130 may implement the separation of keywords by utilizing a data field to indicate which carrier a carrier listing may apply to. For example, a revenue generator A 110A may have several listings for the same keyword; however, they may be differentiated by a data field indicating which carrier each listing applies to. Alternatively or in addition if the database architecture does not support the addition of a separate field, or if the service provider 130 wishes to utilize the functionality of an existing web search marketing system, the keywords for each carrier may be separated by adding prefixes to the keywords. In this case, each of the carriers may be identified by a unique prefix identifier. The prefix identifier may include a combination of the geographical location of the carrier and a descriptor of the carrier. For example, the carrier SPRINT may have a prefix of "usmobsprintsb".

The prefix may be separated from the keyword by a keyword separator, such as the character string "vxv". The purpose of the keyword separator may be to identify the location in the character string where the prefix ends and the keyword begins. The "vxv" keyword separator may be particularly functional in this regard, because this sequence of letters may very rarely, or never, appear in the English language. Thus, the presence of the "vxv" character string may indicate the end of the prefix and the beginning of the keyword. For example, if the revenue generator A 110A bid on the keyword "dvd" for users on the carrier SPRINT, the keyword may be stored in an existing search marketing database as "usmobsprintsbvxvdvd". The service provider 130 may later search for the advertisements associated with SPRINT for the keyword "dvd" by searching for the keyword "usmobsprintsbvxvdvd". Such a keyword may be a mobile identification parameter and may serve to identify the mobile carrier, and perhaps the mobile carrier gateway, originating the request.

Figure 2:
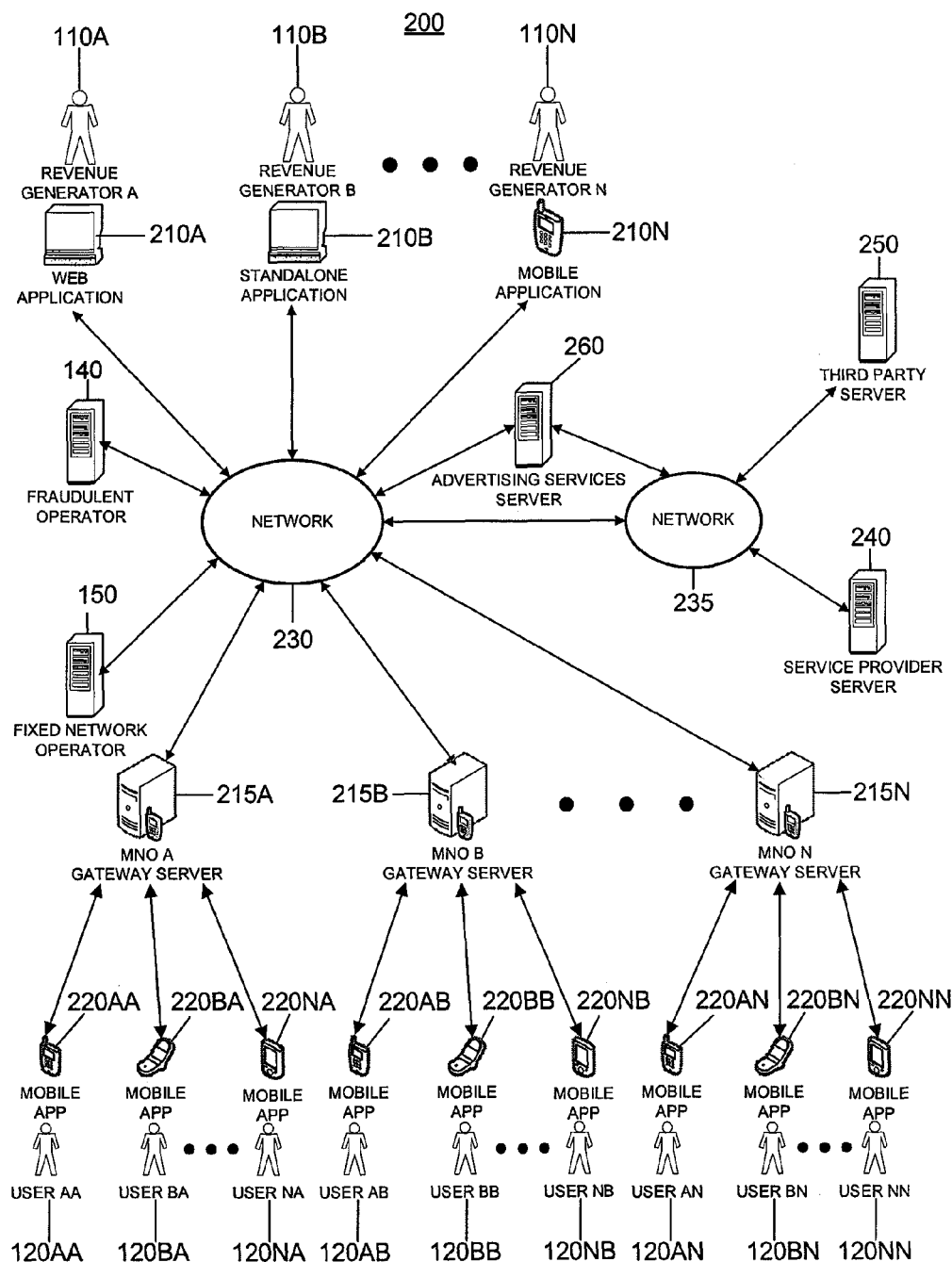
FIG. 2 is a block diagram of a simplified view of a network environment implementing a system for detecting and handling click fraud in a mobile environment.

FIG. 2 provides a simplified view of a network environment implementing a system 200 for handling and detecting click fraud over mobile devices. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 200 may include one or more web applications, standalone applications and mobile applications 210A, 210B, ... 210N, generally referred to as the applications 210A-N, which may be collectively or individually referred to as client applications of the revenue generators 110A-N. The system 200 may also include one or more mobile applications, or mobile apps 220AA, 220BA, ... 220NA, 220AB, 220BB, ... 220NB, ... 220AN, 220BN, ... 220NN, generally referred to as the mobile applications 220AA-NN, which may collectively be referred to as client applications of the users 120AA-NN, or individually as a user client application. The system 200 may also include one or more MNO gateway servers 215A, 215B, ... 215N, generally referred to as the MNO gateway servers 215A-N, a network 230, a network 235, the service provider server 240, a third party server 250, an advertising services server 260, a fraudulent operator 140, and a fixed network operator 150.

Some or all of the advertising services server 260, service provider server 240, third-party server 250, fraudulent operator 140, and fixed network operator 150 may be in communication with each other by way of network 235 and may be the system or components described below in FIG. 9. The advertising services server 260, third-party server 250, service provider server 240, fraudulent operator 140, and fixed network operator 150 may each represent multiple linked computing devices. Multiple distinct third party servers, such as the third-party server 250, may be included in the system 200. The third-party server 250 may be one of the MNO gateway servers 215A-N or a server associated with, or in communication with one of the MNO gateway servers 215A-N.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The revenue generators 110A-N may use a web application 210A, standalone application 210B, or a mobile application 210N, or any combination thereof, to communicate to the service provider server 240, such as via the networks 230, 235. The service provider server 240 may communicate to the revenue generators 110A-N via the networks 230, 235, through the web applications, standalone applications or mobile applications 210A-N.

The users 120AA-NN may use one of the mobile applications 220AA-220NN, such as a mobile web browser, to communicate with the service provider server 240, via the MNO gateway servers 215A-N and the networks 230, 235. The service provider server 240 may communicate to the users 120A-N via the networks 230, 235 and the MNOs 215A-N, through the mobile applications 220AA-NN.

The web applications, standalone applications and mobile applications 210A-N, 220AA-NN may communicate through the network 230 in any configuration that supports data transfer. This may include a data connection to the network 230 that may be wired or wireless. Any of the web applications, standalone applications and mobile applications 210A-N, 220AA-NN may individually be referred to as a client application. The web application 210A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B may run on a machine that may have a processor, memory, a display, a user interface and a communication interface. The processor may be operatively connected to the memory, display and the interfaces and may perform tasks at the request of the standalone applications 210B or the underlying operating system. The memory may be capable of storing data. The display may be operatively connected to the memory and the processor and may be capable of displaying information to the revenue generator B 110B. The user interface may be operatively connected to the memory, the processor, and the display and may be capable of interacting with a revenue generator A 110A. The communication interface may be operatively connected to the memory, and the processor, and may be capable of communicating through the networks 230, 235 with the service provider server 240, third party server 250 and advertising services server 260. The standalone applications 210B may be programmed in any programming language that supports communication protocols. These languages may include: SUN JAVA, C++, C#, ASP, SUN JAVASCRIPT, asynchronous SUN JAVASCRIPT, or ADOBE FLASH ACTIONSCRIPT, amongst others.

The mobile applications 210N, 220AA-NN may run on any mobile device which may have a data connection. The mobile applications 210N, 220AA-NN may be a web application 210A, a standalone application 210B, or a mobile browser. The mobile device may be one of a broad range of electronic devices which may include mobile phones, PDAs, handheld devices, and laptops and notebook computers. The mobile device may have a reduced feature set, such as a smaller keyboard and/or screen, and may be incapable of supporting a traditional web search.

The data connection of the mobile device may be a cellular connection, such as a GSM/GPRS/WCDMA connection, a wireless data connection, an internet connection, an infra-red connection, a Bluetooth connection, or any other connection capable of communicating data. The data connection may be used to connect directly to the network 230, or to connect to the network 230 through the MNO gateway servers 215A-N. The MNO gateway servers 215A-N may control the access the mobile applications 210AA-NN may have to the network. The MNO gateway servers 215A-N may also control the technology supporting the respective mobile applications 220AA-NN. This may affect all aspects of the user experience, such as signal strength and availability, speed and billing mechanisms. For example, the MNO gateway server A 215A may only allow the users 120AA-NA access to content provided by partners of the MNO A 115A. Furthermore, the MNO gateway servers 215A-N may only allow users 120AA-NN access to data in a specific format, such as WML, XHTML, NTT DOCOMO IMODE HTML, or cHTML. Alternatively or in addition, the mobile applications 220AA-NN may only support one of the aforementioned formats. MNO gateway servers 215A-N may include any server that routes requests from many individual users or devices through a limited set of IP addresses, such as the RESEARCH IN MOTION BLACKBERRY gateway and OPERA, which operates a server-based transcoding solution that processes requests that originate from certain OPERA browsers in certain markets.

The service provider server 240 may include one or more of the following: an application server, a data source, such as a database server, a middleware server, and an advertising services server. One middleware server may be a mobile commerce platform, such as the YAHOO! SUSHI platform, which may properly encode data, such as mobile pages or mobile advertisements, to the formats specific to the MNO gateway servers 215A-N. The middleware server may receive requests from the users 120AA-NN, the MNO gateway servers 215A-N, the fraudulent operator 150, or users of the fixed network operator 150. The middleware may generate a service provider-generated identifier, such as a Mobile Identification Number (MIN), a Mobile Subscriber Integrated Services Digital Network (MSISDN) number, encrypted forms of a MIN or MSISDN, or other similar unique identifiers. The service provider-generated identifiers may be passed along with the request to the service provider 130 and/or the revenue generators 110A-N. The service provider-generated identifiers may be generated based on other information. Such information may include cookie data, a mobile identification parameter provided by the mobile carrier gateway, or information contained within a uniform resource locator (URL).

The service provider server 240 may co-exist on one machine or may be running in a distributed configuration on one or more machines. The service provider server 240 may collectively be referred to as the server. The service provider server 240 may receive requests from the users 120AA-NN and the revenue generators 110A-N and may serve mobile pages to the users 120AA-NN and web pages and/or mobile pages to the revenue generators 110A-N based on their requests.

The third party server 250 may include one or more of the following: an application server, a data source, such as a database server, a middleware server, and an advertising services server. The third party server 250 may co-exist on one machine or may be running in a distributed configuration on one or more machines. The advertising services server 260 may provide a platform for the inclusion of advertisements in pages, such as web pages or mobile pages. The advertising services server 260 may be used for providing mobile advertisements that may be displayed to the users 120AA-NN.

Figure 9:
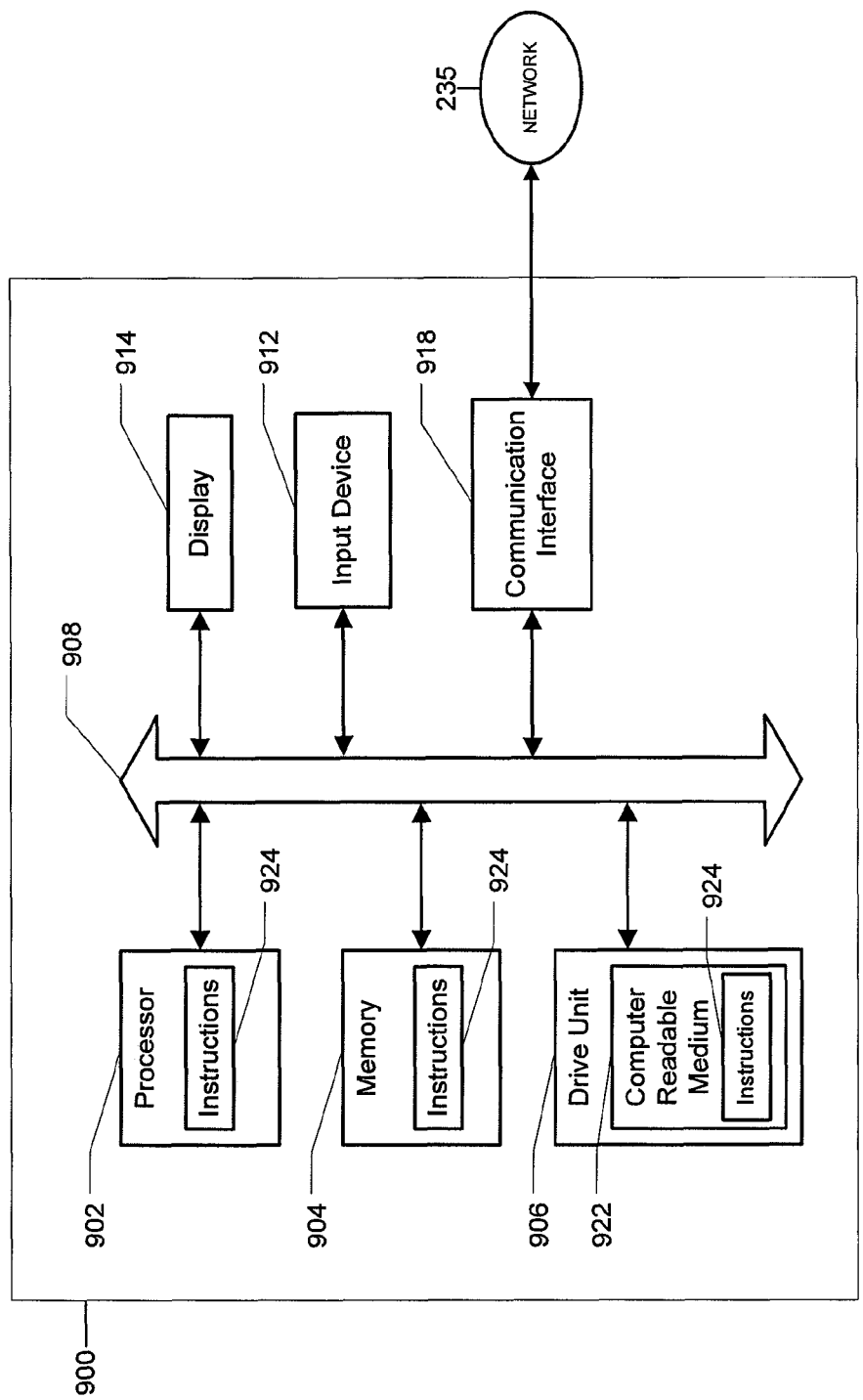
FIG. 9 is a block diagram of a computer system used in implementing a system for detecting and handling click fraud in a mobile environment.

The service provider server 240, the third party server 250 and the advertising services server 260 may be one or more computing devices of various kinds, such as the computing device in FIG. 9. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 210A may employ HTTP to request information, such as a web page, from a web server, which may be a process executing on the service provider server 240 or the third-party server 250.

There may be several configurations of database servers, application servers, middleware servers and advertising services servers included in the service provider server 240 or the third party server 250. Database servers may include MICROSOFT SQL SERVER, ORACLE, IBM DB2 or any other database software, relational or otherwise. The application server may be APACHE TOMCAT, MICROSOFT IIS, ADOBE COLDFUSION, YAPACHE or any other application server that supports communication protocols. The middleware server may be any middleware that connects software components or applications. The application server on the service provider server 240 or the third party server 250 may serve pages, such as web pages, to the users 120AA-NN and the revenue generators 110A-N. The advertising services server may provide a platform for the inclusion of advertisements in pages, such as web pages. The advertising services server 260 may also exist independent of the service provider server 240 and the third party server 250.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
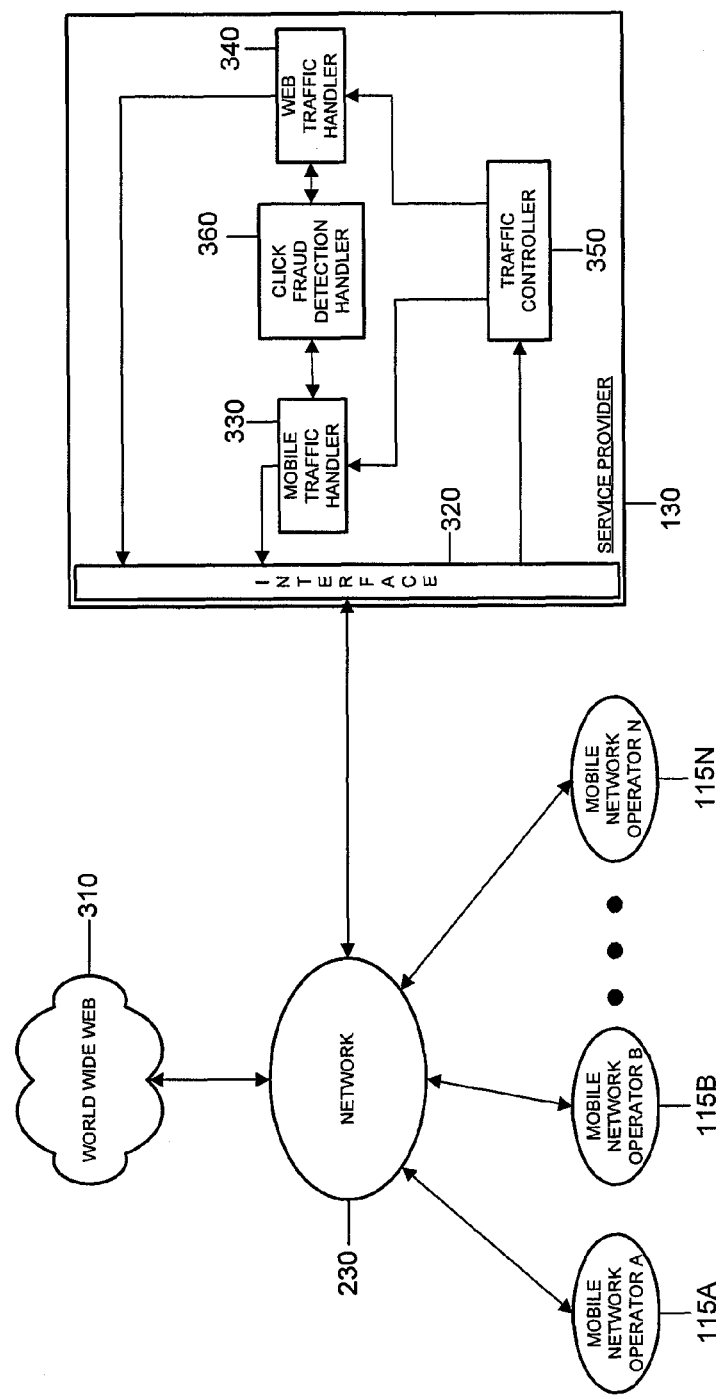
FIG. 3 is a block diagram of a system for separating mobile traffic from web traffic in a system for detecting and handling click fraud in a mobile environment.

FIG. 3 provides a view of the functionality supporting the separation of web and mobile marketplaces in the systems of FIG. 1 and FIG. 2, or other systems for handling and detecting click fraud over mobile devices. Not all of the depicted components may be required, however, and some implementations may include additional components not shown in the figure. Variations in the arrangement and type of the components may be made without departing from the spirit or scope of the claims as set forth herein. Additional, different or fewer components may be provided.

FIG. 3 may include a network such as the world wide web 310, MNO A 115A, MNO B 115B, MNO N 115N, the network 230, and the service provider 130. The service provider 130 may include an interface 320, a traffic controller 350, a mobile traffic handler 330, a web traffic handler 340, and a click fraud detection handler 360.

The world wide web 310 may represent all applications connected to the world wide web 310, interacting with the service provider 130, capable of the full search functionality provided by standard HTML web pages, such as the web application 210A. The MNOs 115A-N may represent the applications connected to the MNOs 115A-N interacting with the service provider 130, such as the mobile applications 220AA-NN. The service provider 130 may utilize the interface 320 to receive the traffic from the network 230. The traffic controller 350 may determine the origin of the traffic and direct the traffic to the appropriate handler, the mobile traffic handler 330 or the web traffic handler 340.

The mobile traffic handler 330 and the web traffic handler 340 may communicate with a single click fraud detection handler 360. Alternatively or in addition the mobile traffic handler 330 may communicate with a mobile click fraud detection handler and the web traffic handler 340 may communicate with a web click fraud detection handler. The click fraud detection handler 360 may be independent of the mobile traffic handler 330 and the web traffic handler 340. Alternatively or in addition the click fraud detection handler 360 may be integral with the mobile traffic handler 330 and the web traffic handler 340. The click fraud detection handler 360 may perform a single click fraud analysis on the traffic through both the mobile traffic handler 330 and the web traffic handler 340, or the click fraud detection handler 360 may perform a different click fraud analysis for the traffic through the mobile traffic handler 330 and the traffic through the web traffic handler 340.

In operation, the world wide web 310, and the MNOs 115A-N may communicate with the service provider 130 via the network 230. The service provider 130 may receive traffic from the world wide web 310 and the MNOs 115A-N through the network 230 and via the interface 320. The interface 320 may communicate the traffic to the traffic controller 350. The traffic controller 350 may determine the origin of the traffic. The traffic controller 350 may use the IP address associated with the request to determine the origin of the request.

The IP address may be obtained from the user agent string of the request. The user agent string may contain information relating to the source of the request, such as the IP address or mobile carrier identification information. All requests from any user on a given MNO gateway server may have the same, or similar, IP addresses. Thus, a request from a particular MNO gateway server or from an MNO in general, may be identifiable by the IP address of the request. The carrier ID may also be capable of identifying the source of the request as an MNO gateway server.

Alternatively or in addition the service provider 130 may provide distinct mobile search sites for each of the MNOs 115A-N and the world wide web. The mobile search sites may contain a hidden input variable or some other information that indicates the source of the search request. For example the mobile search site for the carrier SPRINT may include a hidden INPUT variable with a value of "usmobsprintsb" indicating that the search request originated from the MNO SPRINT. Alternatively or in addition the service provider 130 may provide a dedicated feed for each of the MNOs 115A-N. The feed may be implemented by a separate application server for each of the MNOs 115A-N. The particular feed the request is received from may indicate the source of the request. Similarly the MNO 115A-N may incorporate mobile device information into the hidden INPUT variable. For example, "usmobsprintsbpalmone" may indicate that the request originated from a PALM ONE mobile device.

Once the traffic controller 350 determines the origin of the traffic the traffic controller 350 may forward the traffic to the appropriate handler. If the traffic originated from one of the MNOs 115A-N, then the traffic may be directed to the mobile traffic handler 330. If the traffic was generated from the world wide web 310, the traffic controller 350 may direct the traffic to the web traffic handler 340. If the system 100 implements keyword separation through the use of a database field, the traffic controller 350 may supply the origin of the request to the mobile traffic handler 330.

If the system 100 implements keyword separation through the use of prefix identifiers, the traffic controller 350 may determine the origin of the traffic and add the prefix associated with the origin and the keyword separator to the keyword. For example, if a keyword search for "dvd" originated from the carrier SPRINT, the traffic controller 350 may add the prefix "usmobsprintsb" followed by "vxv" to "dvd," resulting in "usmobsprintsbvxvdvd". The search keyword may then be forwarded to the mobile traffic handler 330 as "usmobsprintsbvxvdvd". The mobile traffic handler 330 may then use "usmobsprintsbvxvdvd" to determine which advertisements may relate to the keyword "dvd" on the carrier SPRINT. Alternatively or in addition, all traffic may be handled by one handler, such as the web traffic handler 340. Such a keyword may be a mobile identification parameter.

The mobile traffic handler 330 may receive the keyword and the origin of the request from the traffic controller 350. The mobile traffic handler 330 may then determine which advertisements to return to the user, such as the user AA 120AA. The mobile traffic handler 330 may first identify the carrier, such as the MNO A 115A. Only advertisements associated with bids on the keyword for the MNO A 115A may be selected. In the case of prefix identifiers, the step of identifying the carrier may be used to identify the proper prefix. The mobile traffic handler 330 may then select one or more advertisements to be returned to the user AA 120AA. The determination may be based on any suitable method, including by using the amount bid on for the advertisement, such as the advertisement associated with the highest bid for the keyword on the MNO may be displayed to the user AA 120AA. Alternatively or in addition the mobile traffic handler 330 may account for the relevancy of the advertisement to the keyword or other methods utilized by web search marketing technology, such as the YAHOO! SEARCH MARKETING technology. The advertisement may consist of a link to the mobile URL site of a revenue generator and the advertisement title and/or description as the text of the link displayed to the user AA 120AA.

If a revenue generator A 110A does not have a mobile ad for the MNO A 115A, the mobile traffic handler 330 may use a wireless application protocol advertisement, i.e. WAP ad, in lieu of a mobile advertisement. The WAP ad may include the phone number of the revenue generator A 110A and/or a logo of the revenue generator A 110A. The data for the WAP ad may be stored in the advertisement title or advertisement description field of the MNO listing. The WAP ad may allow the revenue generators 110A-N to bid on keywords for a mobile carrier even if they don't have a mobile site or a mobile site supporting the technology of the carrier.

The service provider 130 may have technology capable of generating a WAP ad, or "call offer," for each of the mobile carriers based on the advertisement title and/or logo of the revenue generator A 110A. For example, the service provider 130 may have a database table containing a row for each of the MNOs 115A-N and a field containing skeleton code for generating a "WAP ad" for each MNO 115A-N. The service provider 130 may simply retrieve the "WAP ad" skeleton code and insert the text of the advertisement title and/or description and/or the logo of the revenue generator A 110A. The service provider 130 may then host the "WAP ad" on behalf of the revenue generator A 110A.

Alternatively, or in addition, the service provider 130 may utilize middleware, such as the YAHOO! SUSHI platform, to properly encode the "WAP ads" for each MNO 115A-N. The data associated with the "WAP ad" may be communicated to the middleware in XML format and the middleware may encode the "WAP ad" to conform with the underlying technology of each MNO 115A-N, such as WML, XHTML, NTT DOCOMO IMODE HTML, or cHTML.

The mobile traffic handler 330 may then communicate the advertisement to the interface 320. The interface 320 may communicate the advertisement and search results to the mobile application AA 220AA via the network 230 and the MNO A 115A. The mobile application AA 220AA may display the advertisement to the user AA 120AA.

Figure 4:
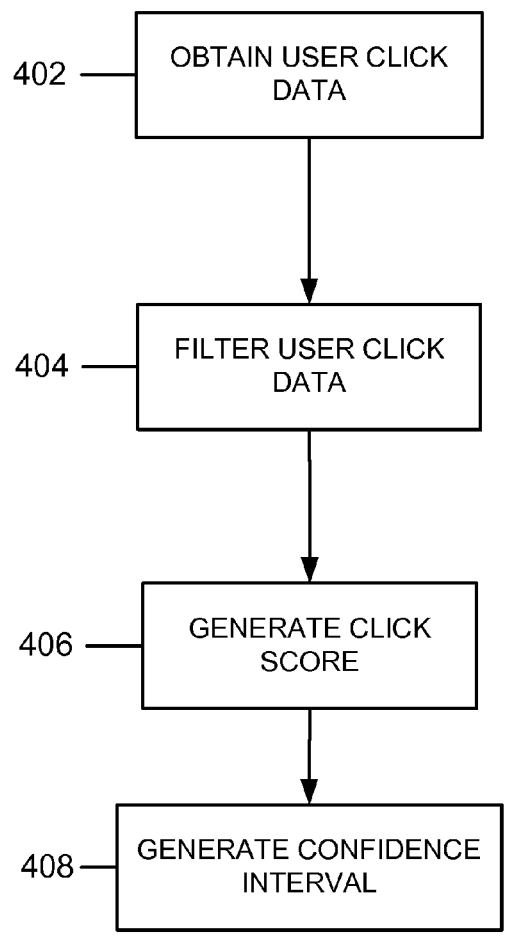
FIG. 4 is a flowchart illustrating process for scoring a user click in a system for detecting and handling click fraud in a mobile environment.

FIG. 4 illustrates the process 400 that may be used to score a user click in a system for handling and detecting click fraud in a mobile environment, such as the click fraud detection handler 360. At block 402 the process 400 may obtain user click data associated with a user click by monitoring and/or gathering information associated with the click. User click data may include a referring URL, cookie data, an IP address, a Mobile Identification Number (MIN), a Mobile Subscriber Integrated Services Digital Network (MSISDN) number, a geographic location, whether the click was made in response to a query, whether the click was made by an automated script, or other click characteristics. The process 400 may compile the user click data. Alternatively, or in addition, the process 400 may receive user click data compiled by another click monitoring process.

At block 404 the process 400 may filter the user click data. The process 400 may apply the user click data to filtering logic to generate filter output data. The filtering logic may include one or more filters. A filter may be a function designed to identify a certain kind of invalid traffic. The filter may be implemented in hardware, software or a combination of these. The filter output data may indicate which filters fired in response to the user click data. The filter output data may also include filter scores.

A filter may be a deterministic filter, such as a binary function that is "1" for self-declared robots and "0" otherwise. In this example, the filter may be said to fire on a click if the value of the function is not "0." A filter may also be a probabilistic filter. For example, a filter may determine whether over a certain period of time a particular advertisement has been targeted by a particular client more often than an average number of clicks for this advertisement. In this example, if a client produced two times more clicks for a particular advertisement than the average, a filter may consider historical analysis or statistics to determine whether the above-average number of clicks represents a random fluctuation as opposed to a fraudulent attack. From a historical analysis, for example, it may be known that clients that produce two times more clicks than an average are fraudulent sixty-percent (60%) of the time, and the result of normal variability forty-percent (40%) of the time. In this case, if the score of a perfect click is 1, the filter may score the click as 0.4 with the confidence interval (0.3, 0.5) corresponding to a confidence level of 90%.

A filter score may include a binary output, representing, for example, whether or not the corresponding filter fired. A filter score may include a fractional number, a range, or other numerical representations, representing, for example, the likelihood that the filtered data corresponds to a valid or invalid click.

The filtering logic may include filters that check specific click characteristics. For example, the filtering logic may include an automated script filter. Such a filter may fire when the click originates from a known automated script as opposed to originating from, for example, a legitimate user search. The filter may also include whitelists or blacklists, including lists obtained from various agencies or organizations, such as the Interactive Advertising Bureau.

The filtering logic may also include an IP address filter. The IP address filter may fire when the IP address, device identifier, or carrier identifier, generally IP address, from which the click originated suggests the click is valid or invalid. The IP address filter may include algorithms, look-up functions, or other processing techniques such as by comparing the IP address from which the click originated to a list or database of bad or "blacklisted" IP addresses. Alternatively or in addition the IP address from which the click originated may be compared to a list or database of good or "whitelisted" IP addresses. The filter score provided by the IP address filter may be a simple "1" or "0," representing whether or not the filter fired and therefore whether the click is valid or invalid.

An IP address filter may also output a fractional or other numerical filter score representing the confidence with which click traffic from a certain IP address can be deemed valid or invalid. For example, a proxy server X may be known to contain seventy-percent (70%) of valid traffic and thirty-percent (30%) of invalid traffic. In this example, if the score of a perfect click is 1, the filter may provide a score of 0.7 for a click from proxy server X.

Alternatively or in addition the filtering logic may include filters that correspond to one or more geographic locations. The geographic location filter may provide a filter score that may represent the confidence level in declaring a click invalid based on the geographic origin of the click. The geographic location of the user may be identified by analyzing the IP address, implementing various geo-coding techniques, or by other geographic locating methods. The geographic location filter may include or may access data associated with the identified geographic location, such as statistical or extrapolated data that indicates the likelihood that a click is valid or invalid for a given location.

When a filter or combination of filters fire, the process 400 may determine a filter score using statistical data, including conversion rates for the filters or combinations of filters that fired in response to the user click data. Let S be the population of clicks, and let s represent an element of S. The element s may include one or more click characteristics, including the IP address, referring URL, cookie data, a device identification parameter, a mobile identification parameter, or other click characteristics.

At block 406 the process 400 may analyze the filter output data, including filter scores, to generate a click score. As explained above, the filter output data may include multiple filter scores generated by the filters that make up the filtering logic. The process 400 may apply the filter output data to one or more scoring algorithms to calculate the click score. The scoring algorithms may calculate the click score using a variety of techniques.

The scoring algorithms may average or aggregate the filter scores to obtain the click score. The scoring algorithms may apply weights to the filter scores to enable the results from different filters to impact the continuous score differently. The scoring algorithm may also set the click score to be equal to, or substantially equal to, the filter score having the largest magnitude.

At block 408 the process 400 may generate a confidence interval associated with the click score. The process 400 may apply the click score and/or the filter output data to the scoring algorithm to generate the confidence interval. The algorithms for calculating the click score may be the same or different algorithms for calculating the confidence interval. The click score and the confidence interval may then be used to determine whether a click is valid or invalid.

Figure 5:
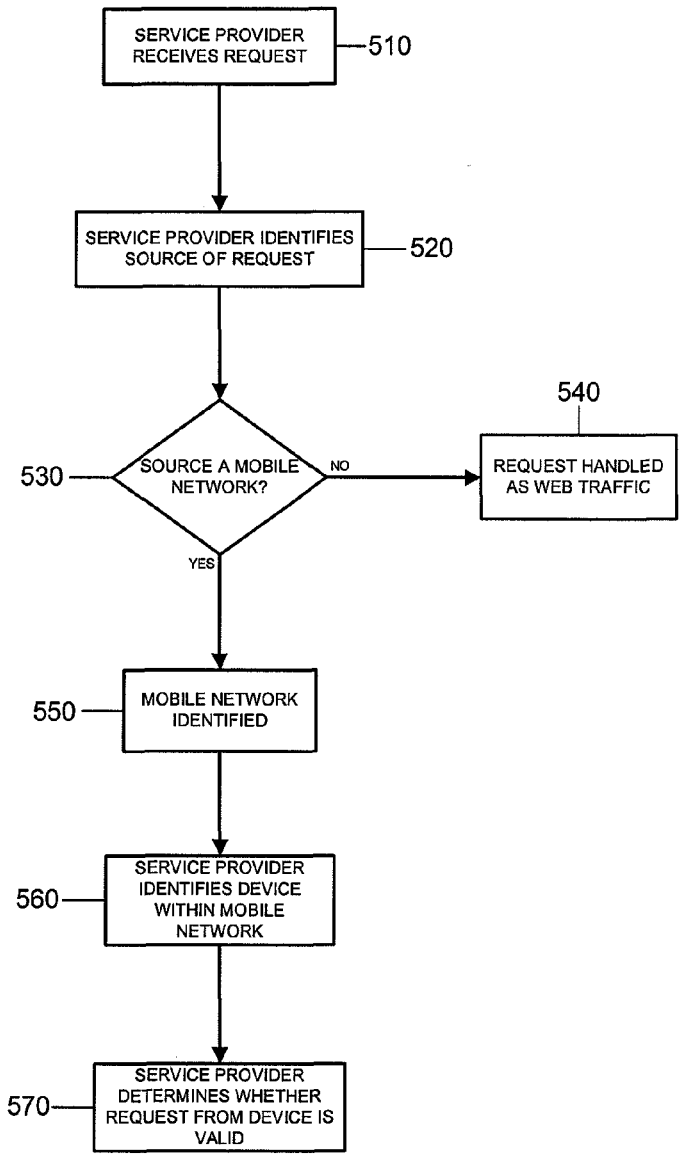
FIG. 5 is a flowchart illustrating a process for identifying a source of a request and handling the request in a system for detecting and handling click fraud in a mobile environment.

FIG. 5 is a flow chart illustrating an exemplary operation of the systems of FIG. 1 and FIG. 2, or other systems for detecting or handling click fraud over mobile devices. At block 510, the service provider 130 may receive a request, such as a keyword search request or a click request, from one of the users 120AA-NN, such as the user AA 120AA. At block 520 the service provider 130 may identify the source of the request, such as by identifying the IP address of the requesting user AA 120AA. The IP address of the request may be used to determine whether the request originated from a mobile network, and, if so, which mobile network. For example, the service provider 130 may use an IP address filter. The IP address filter may include algorithms, look-up functions, or other processing techniques such as by comparing the IP address from which the click originated to a list or database of bad or "blacklisted" IP addresses. The IP address of the request may be compared to a list or database of good or "whitelisted" IP addresses. The filter score provided by the IP address filter may be a simple "1" or "0," representing whether or not the filter fired and therefore whether the click is valid or invalid. If the request was generated by a page belonging to the service provider 130, the page may have hidden variables identifying the source MNO of the request. Alternatively or in addition the service provider 130 may have a dedicated feed for the MNO.

At block 530, the service provider 130 may determine whether the request originated from a mobile network. If the request did not originate from a mobile network, the system 100 may move to block 540. At block 540 the request may be handled as traditional web traffic and may be forwarded to the web search marketing system. Alternatively or in addition the service provider 130 may apply a web traffic-based click fraud analysis on the request.

If the service provider 130 determines the request was generated from a mobile network the system 100 may move to block 550. At block 550 the originating mobile network may be identified, such as the MNO A 115A. The mobile network may be identified by the IP address of the requesting user AA 120AA. If the request was generated by a page belonging to the service provider 130, the page may have hidden variables identifying the source MNO of the request. Alternatively or in addition the service provider 130 may have a dedicated feed for the MNO.

At block 560, the service provider 130 may determine what device originated the request within the mobile network. Pinpointing a particular device as the origin of a request may aid in determining whether the request has been made fraudulently. The device may be identified through information accompanying the request, such as hidden variables generated by a page belonging to the service provider. The information may include a Mobile Identification Number (MIN), a Mobile Subscriber Integrated Services Digital Network (MSISDN) number, or encrypted versions of a MIN or MSISDN. Alternatively or in addition the information may include browser information, such as information identifying the request as originating from a BLACKBERRY browser. The identification may be a statistical or probabilistic identification rather than an absolute identification. For example, a service provider 130 may determine that a request originated from a particular PALM ONE user based on hidden variables such as browsing history, browser information, and the historical percentage of PALM ONE users for a given IP address.

At block 570, the service provider 130 may determine whether the request was valid. The determination may be based on the identification of the originating device and/or whether the identification was successful. Alternatively or in addition the determination may be based on historical data of fraudulent activity from the originating IP address and/or the originating device. The validity of a request may depend on service provider-specific criteria. A request that originates from a carrier that is not within a home or target market may be considered as invalid or flagged as suspect. For example, a request from a CINGULAR user who is traveling in Europe but whose home market is in the U.S. may be considered invalid. Alternatively or in addition the determination may be based on a click fraud analysis applied at a device level. For example, excessive clicks originating from one particular device, e.g. via a MIN or MSISDN number, may be considered invalid or flagged as being suspect.

Figure 6:
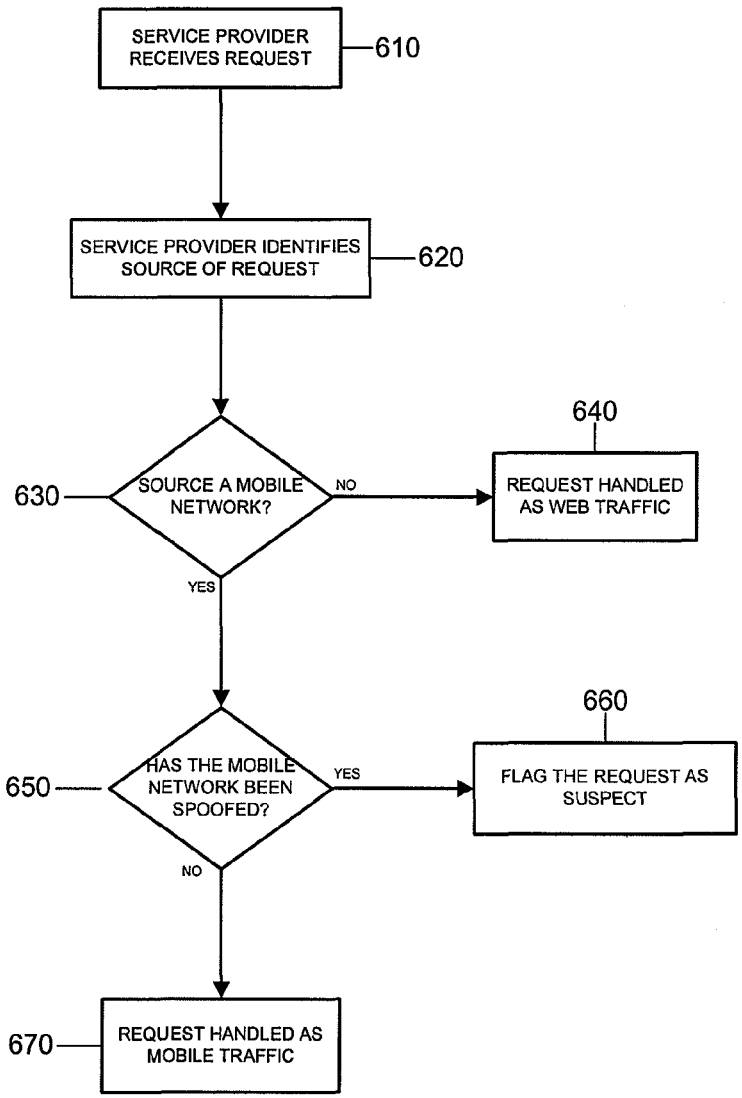
FIG. 6 is a flowchart illustrating a process for identifying a source of a request and flagging the request as suspect in a system for detecting and handling click fraud in a mobile environment.

FIG. 6 is a flow chart illustrating an alternative exemplary operation of the systems of FIG. 1 and FIG. 2, or other systems for detecting or handling click fraud over mobile devices. At block 610, the service provider 130 may receive a request, such as a keyword search request or a click request, from one of the users 120AA-NN, such as the user AA 120AA. At block 620 the service provider 130 may identify the source of the request, such as by identifying the IP address of the requesting user AA 120AA. At block 630, the service provider 130 may determine whether the request originated from a mobile network. If the request did not originate from a mobile network, the system 100 may move to block 640. At block 640 the request may be handled as traditional web traffic. If the service provider 130 determines the request was generated from a mobile network the system 100 may move to block 650.

At block 650, the system provider 130 may determine whether the request from the mobile network has been spoofed, i.e. whether the request included a forged or fraudulent source IP address. The determination may be performed by correlating information within or accompanying the request with other information within or accompanying the request, or by correlating information within or accompanying the request with information available to the service provider 130. The information may include hidden variables, including variables identifying the source MNO of the request. Alternatively or in addition the information may include sequence numbers negotiated between the MNO and the system provider 130 in accordance with Transmission Control Protocol (TCP) to ensure that arriving packets are part of an established connection.

If the service provider 130 determines the request was spoofed, the system 100 may move to block 660. At block 660 the request may be flagged as suspect. The flag may be performed by attaching additional information, for example hidden variable information, to the specific request. The request may then be passed to a supervising operator. The supervising operator may take further review as to the validity or invalidity of the request. Alternatively or in addition the supervising operator may take affirmative action, such as prohibiting further requests from a particular device, MNO, or other originating source. Alternatively or in addition the flag may be performed by adding an identification number to a blacklist or removing an identification number from a whitelist. The identification number may be an IP address and/or a device identification number such as a MSISDN. When a source originates an inordinate number of flags, the service provider 130 may default to flagging all of the requests from that source.

If the service provider 130 determines the request was not spoofed, the system 100 may move to block 670. At block 670, the request may be handled as mobile traffic and the request may be forwarded to a mobile search marketing system. Alternatively or in addition the service provider 130 may apply a mobile traffic-based click fraud analysis on the request.

Figure 7:
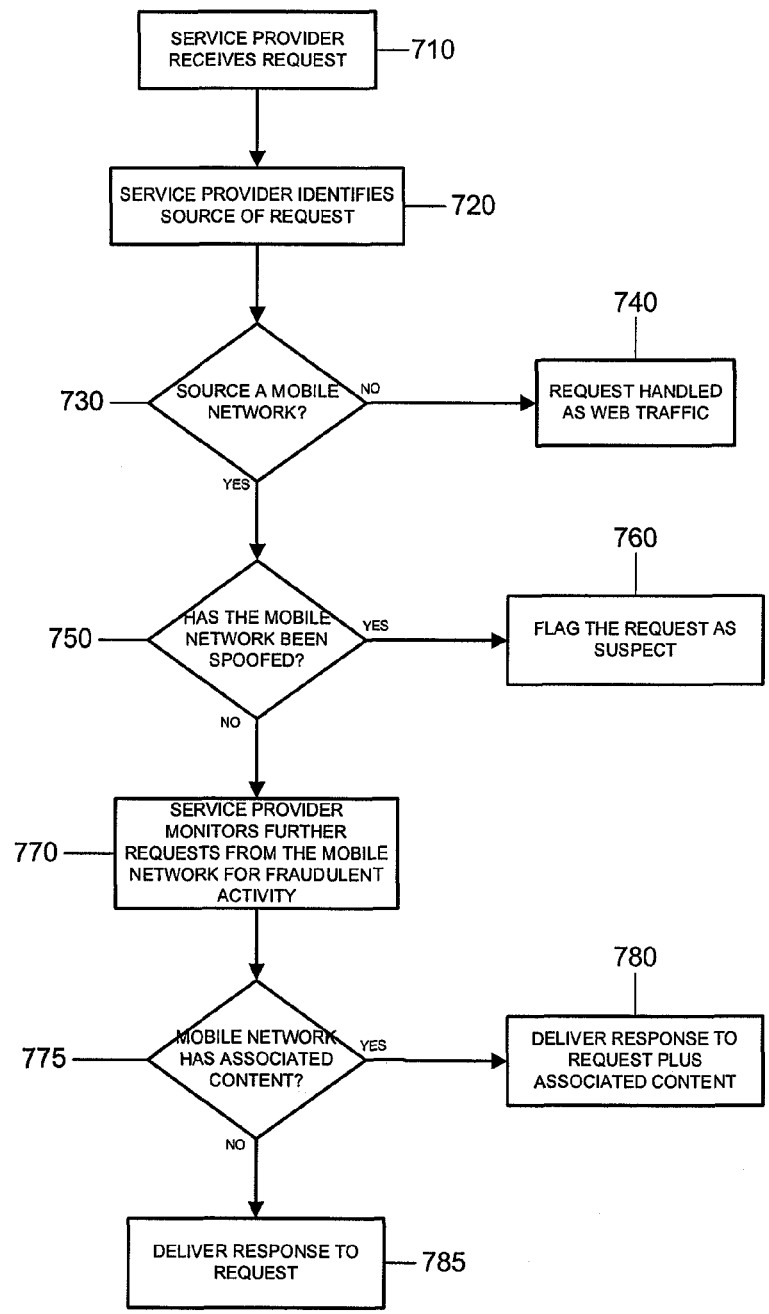
FIG. 7 is a flowchart illustrating a process for handling associated content in a system for detecting and handling click fraud in a mobile environment.

FIG. 7 is a flow chart illustrating an alternative exemplary operation of the systems of FIG. 1 and FIG. 2, or other systems for detecting or handling click fraud over mobile devices. At block 710, the service provider 130 may receive a request, such as a keyword search request or a click request, from one of the users 120AA-NN, such as the user AA 120AA. At block 720 the service provider 130 may identify the source of the request, such as by identifying the IP address of the requesting user AA 120AA. At block 730, the service provider 130 may determine whether the request originated from a mobile network. If the request did not originate from a mobile network, the system 100 may move to block 740. At block 740 the request may be handled as traditional web traffic. If the service provider 130 determines the request was generated from a mobile network the system 100 may move to block 750. At block 750, the system provider 130 may determine whether the request from the mobile network has been spoofed. If the service provider 130 determines the request was spoofed, the system 100 may move to block 760. At block 760, the request may be flagged as suspect.

If the service provider 130 determines the request was not spoofed, the system 100 may move to block 770. At block 770 the service provider 130 may monitor further requests from the mobile network for fraudulent activity. The monitoring may include directing mobile traffic through a mobile traffic handler 330 that performs a click fraud analysis on the traffic from that mobile network. Alternatively or in addition the monitoring may include flagging requests originating from the mobile network or from specific devices within the originating mobile network until the mobile network or specific device has been placed on a whitelist. The system 100 may then move to block 775.

At block 775 the service provider 130 determines whether a mobile network has associated content. The associated content may include carrier-specific targeted mobile advertisements, such as online graphical or textual advertisements. The associated content may include carrier-specific announcements or public service notifications. Alternatively or in addition the associated content may include device- or user-specific advertisements or announcements. If the service provider 130 has associated content, the system 100 may move to box 780. At box 780 the service provider delivers a response to the request along with associated content. The response may be delivered by a mobile traffic handler 330.

If the service provider 130 does not have associated content, the system 100 may move to box 785. At box 785 the service provider may deliver a response to the request. The response may include additional information. The additional information may include a WAP ad, a generic advertisement, or a cookie data. The response may be delivered by a mobile traffic handler 330.

Figure 8:
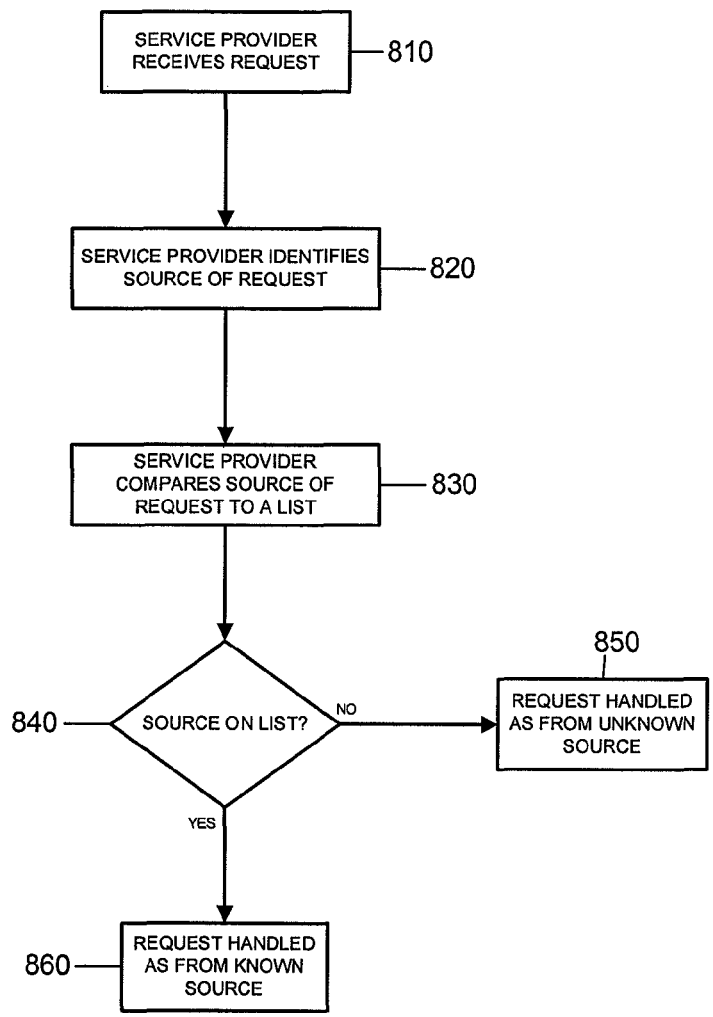
FIG. 8 is a flowchart illustrating a process for comparing the source of a request to a list in a system for detecting and handling click fraud in a mobile environment.

FIG. 8 is a flow chart illustrating an alternative exemplary operation of the systems of FIG. 1 and FIG. 2, or other systems for detecting or handling click fraud over mobile devices. At block 810, the service provider 130 may receive a request, such as a keyword search request or a click request, from one of the users 120AA-NN, such as the user AA 120AA. At block 820 the service provider 130 may identify the source of the request, such as by identifying the IP address of the requesting user AA 120AA. If the request was generated by a page belonging to the service provider 130, the page may have hidden variables identifying the source MNO of the request. Alternatively or in addition the service provider 130 may have a dedicated feed for the MNO.

At block 830 service provider may compare the source of the request to a list. The IP address of the request may be used to determine whether the request originated from a mobile network, and, if so, which mobile network. For example, the service provider 130 may use an IP address filter. The IP address filter may compare the IP address from which the click originated to a list or database of bad or "blacklisted" IP addresses. The IP address of the request may be compared to a list or database of good or "whitelisted" IP addresses. The filter score provided by the IP address filter may be a simple "1" or "0," representing whether or not the filter fired and therefore whether the click is valid or invalid.

At block 840, the service provider 130 determines whether the source is on the list. If the service provider 130 determines the request did not originated from a source on the list, the system 100 may move to block 850. At block 850 the request is handled as if it originated from an unknown source. If the list included whitelisted IP addresses, the request or the source may be flagged as suspect until it is placed on the whitelist. If the list included blacklisted IP addresses, the request or source may be handled by a mobile traffic handler 330.

If the service provider 130 determines the request originated from a source on the list, the system 100 may move to block 860. At block 860 the request is handled as if it originated from a known source. If the list included whitelisted IP addresses, the request or source may be handled by a mobile traffic handler 330. If the list included blacklisted IP addresses, the request or the source may be flagged as suspect until it is removed from the blacklist.

A whitelist or a blacklist may be periodically updated. The updates may account for a change to an existing carrier gateway IP, for an introduction of a new carrier, or to reflect decisions made by the service provider 130. The decisions may include decisions by a supervising operator that a carrier gateway or a device on mobile network should be added or removed from a list.

FIG. 9 illustrates a general computer system 900, which may represent a service provider server 240, a third party server 250, an advertising services server 260, a fraudulent operator 140, a fixed network operator 150, a mobile device or any of the other computing devices referenced herein. The computer system 900 may include a set of instructions 924 that may be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 900 may also be implemented as or incorporated into various devices, such as a personal computer (PC), a tablet PC, a set-top box (STB), a personal digital assistant (PDA), a mobile device, a handheld device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 924 (sequential or otherwise) that specify actions to be taken by that machine. In a particular embodiment, the computer system 900 may be implemented using electronic devices that provide voice, video or data communication. Further, while a single computer system 900 may be illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, such as, a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 904 may include a cache or random access memory for the processor 902. Alternatively or in addition, the memory 904 may be separate from the processor 902, such as a cache memory of a processor, the system memory, or other memory. The memory 904 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 904 may be operable to store instructions 924 executable by the processor 902. The functions, acts or tasks illustrated in the figures or described herein may be performed by the programmed processor 902 executing the instructions 924 stored in the memory 904. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 900 may further include a display 914, such as a liquid crystal display (LCD), an organic light emitting diode (OLED), a flat panel display, a solid state display, a cathode ray tube (CRT), a projector, a printer or other now known or later developed display device for outputting determined information. The display 914 may act as an interface for the user to see the functioning of the processor 902, or specifically as an interface with the software stored in the memory 904 or in the drive unit 906.

Additionally, the computer system 900 may include an input device 912 configured to allow a user to interact with any of the components of system 900. The input device 912 may be a number pad, a keyboard, or a cursor control device, such as a mouse, or a joystick, touch screen display, remote control or any other device operative to interact with the system 900.

The computer system 900 may also include a disk or optical drive unit 906. The disk drive unit 906 may include a computer-readable medium 922 in which one or more sets of instructions 924, e.g. software, can be embedded. Further, the instructions 924 may perform one or more of the methods or logic as described herein. The instructions 924 may reside completely, or at least partially, within the memory 904 and/or within the processor 902 during execution by the computer system 900. The memory 904 and the processor 902 also may include computer-readable media as discussed above.

The present disclosure contemplates a computer-readable medium 922 that includes instructions 924 or receives and executes instructions 924 responsive to a propagated signal; so that a device connected to a network 235 may communicate voice, video, audio, images or any other data over the network 235. The instructions 924 may be implemented with hardware, software and/or firmware, or any combination thereof. Further, the instructions 924 may be transmitted or received over the network 235 via a communication interface 918. The communication interface 918 may be a part of the processor 902 or may be a separate component. The communication interface 918 may be created in software or may be a physical connection in hardware. The communication interface 918 may be configured to connect with a network 235, external media, the display 914, or any other components in system 900, or combinations thereof. The connection with the network 235 may be a physical connection, such as a wired Ethernet connection or may be established wirelessly as discussed below. Likewise, the additional connections with other components of the system 900 may be physical connections or may be established wirelessly. In the case of a service provider server 240, a third party server 250, an advertising services server 260, the servers may communicate with users 120A-N and the revenue generators 110A-N through the communication interface 918.

The network 235 may include wired networks, wireless networks, or combinations thereof. The wireless network may be a cellular telephone network using data networking standards such as 1xRTT, UMTS, HSDPA, EDGE, or EVDO, or an 802.11, 802.11b, 802.11g, 802.11n, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols. Information provided by the network 235 may be accessed through web browsers or mobile web browsers. The browser may be MICROSOFT INTERNET EXPLORER, MOZILLA FIREFOX, APPLE SAFARI, MICROSOFT POCKET INTERNET EXPLORER (POCKET IE), OPERA MINI, ACCESS NETFRONT, PALM BLAZER, NOKIA, CINGULAR MEDIA NET, BLACKBERRY, or THUNDERHAWK.

The computer-readable medium 922 may be a single medium, or the computer-readable medium 922 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 922 may include a solid-state memory such as a memory card or other package that houses one or more non-volatile read-only memories. The computer-readable medium 922 also may be a random access memory or other volatile re-writable memory. Additionally, the computer-readable medium 922 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Alternatively or in addition the service provider 130 and/or the revenue generators 110A-N may use middleware to implement a presentation abstraction layer, such as the YAHOO! MOBILE SUSHI platform, to simplify the process of creating advertising campaigns across multiple MNOs 115A-N.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The disclosed methods, processes, programs, and/or instructions may be encoded in a signal-bearing medium, a computer-readable medium such as a memory, programmed within a device such as on one or more integrated circuits, or processed by a controller or a computer. If the methods are performed by software, the software may reside in a memory resident to or interfaced to a communication interface, or any other type of non-volatile or volatile memory. The memory may include an ordered listing of executable instructions for implementing logical functions. A logical function may be implemented through digital circuitry, through source code, through analog circuitry, or through an analog source such as that occurring through an analog electrical, audio, or video signal. The software may be embodied in any computer-readable or signal-bearing medium, for use by, or in connection with, an instruction executable system, apparatus, or device. Such a system may include a computer-based system, a processor-containing system, or another system that may selectively fetch instructions from an instruction executable system, apparatus, or device that may also execute instructions.

Although selected aspects, features, or components of the implementations are depicted as being stored in memories, all or part of the systems, including the methods and/or instructions for performing such methods consistent with the click traffic scoring system, may be stored on, distributed across, or read from other computer-readable media, for example, secondary storage devices such as hard disks, floppy disks, and CD-ROMs; a signal received from a network; or other forms of ROM or RAM either currently known or later developed.

Specific components of the computer system 900 may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters (e.g., popularity rankings), databases, and other data structures may be separately stored and managed, may be incorporated into a single memory or database, or may be logically and physically organized in many different ways. Programs or instruction sets may be parts of a single program, separate programs, or distributed across several memories and processors.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The computer-readable medium may selectively be, but is not limited to, an electronic, magnetic, optical, electromagnetic, infrared, or semiconductor system, apparatus, device, or propagation medium. A non-exhaustive list of examples of a machine-readable medium may include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A computer-readable medium may also include a tangible medium upon which software is printed, as the software may be electronically stored as an image or in another format (e.g., through an optical scan), then compiled, and/or interpreted, or otherwise processed. The processed medium may then be stored in a computer and/or machine memory.

While various embodiments of the invention have been described, it will be apparent to those of ordinary skill in the art that many more embodiments and implementations may be possible within the scope of the invention. Accordingly, the invention is not to be restricted except in light of the attached claims and their equivalents.

We claim:

1. A method for preventing click fraud in a mobile environment, the method comprising:
    receiving a request including request source information, the request source information including an internet protocol (IP) address and hidden information comprising at least one of cookie data, a mobile identification parameter provided by a mobile carrier, or a service provider-generated identifier;
    identifying a source of the request from the request source information as being either web traffic or mobile traffic;
    handling the request as web traffic when the source of the request is not associated with a mobile carrier as determined in accordance with the identifying;
    handling the request as mobile traffic when the source of the request is associated with a mobile carrier as determined in accordance with the identifying, wherein handling the request as mobile traffic comprises:
    determining whether the IP address in the request source information is invalid, wherein the determining comprises comparing the IP address with IP addresses in a list; and
    flagging the request when the IP address is invalid; and
    sending a response to the request, wherein the sending comprises:
    requesting a result responsive to the request and the hidden information;
    receiving the result, wherein the result includes a uniform resource locator (URL); and
    sending the result to the source of the request.

2. A method for preventing click fraud in a mobile environment, the method comprising:
    receiving a request including request source information;
    identifying a source of the request from the request source information;
    handling the request as mobile traffic when the source of the request is associated with a mobile carrier, wherein the handling the request as mobile traffic comprises:
    determining whether the source of the request is invalid; and
    flagging the request when the source of the request is invalid; and
    sending a response to the request.

3. The method of claim 2, wherein the determining whether the source of the request is invalid comprises comparing an internet protocol (IP) address associated with the request to a whitelist of IP addresses associated with valid mobile carriers.

4. The method of claim 2, wherein the determining whether the source of the request is invalid comprises comparing an internet protocol (IP) address associated with the request to a blacklist of IP addresses associated with fraudulent request sources.

5. The method of claim 2, wherein the determining whether the source of the request is invalid comprises comparing hidden variable information associated with the request to a whitelist of identification information associated with valid mobile carriers.

6. The method of claim 2, wherein the determining whether the source of the request is invalid comprises comparing hidden variable information associated with the request to a blacklist of identification information associated with fraudulent request sources.

7. The method of claim 2, wherein the determining whether the source of the request is invalid comprises:
    referencing other requests received from the source of the request; and
    determining whether the request is invalid based on the other requests.

8. The method of claim 2, wherein the determining whether the source of the request is invalid comprises:
    identifying mobile carrier information associated with the request;
    identifying mobile device information associated with the request; and
    determining whether the request is invalid based on the mobile carrier information and the mobile device information.

9. A system for preventing click fraud in a mobile environment, the system comprising:
    a communication receiving module configured to receive a request including request source information, the communication receiving module further configured to receive the request source information which includes an internet protocol (IP) address and hidden information comprising at least one of cookie data, a mobile identification parameter provided by a mobile carrier, or a service provider-generated identifier;

a source identification module configured to identify a source of the request from the request source information as being either web traffic or mobile traffic;

a web traffic handling module configured to handle the request as web traffic when the source of the request is not associated with a mobile carrier as determined in accordance with the identifying;

a mobile traffic handling module configured to handle the request as mobile traffic when the source of the request is associated with a mobile carrier as determined in accordance with the identifying, the mobile traffic handling module comprising:

an invalidity determination module configured to determine whether the IP address in the request source information is invalid, the invalidity determination module further configured to compare the IP address with IP addresses in a list; and a request flagging module configured to flag the request when the IP address is invalid; and a communication sending module configured to send a response to the request, the communication sending module comprising:

a result requesting module configured to request a result responsive to the request and the hidden information;

a result receiving module configured to receive the result, wherein the result includes a uniform resource locator (URL); and a result sending module configured to send the result to the source of the request.

10. A system for preventing click fraud in a mobile environment, the system comprising:

a communication receiving module configured to receive a request including request source information;

a source identification module configured to identify a source of the request from the request source information as being either web traffic or mobile traffic;

a web traffic handling module configured to handle the request as web traffic when the source of the request is not associated with a mobile carrier as determined in accordance with the identifying;

a mobile traffic handling module configured to handle the request as mobile traffic when the source of the request is associated with a mobile carrier as determined in accordance with the identifying, the mobile traffic handling module comprising:

an invalidity determination module configured to determine whether the source of the request is invalid; and a request flagging module configured to flag the request when the source of the request is invalid; and a communication sending module configured to send a response to the request.

11. The system of claim 10, wherein the invalidity determination module comprises an address comparison module configured to compare an internet protocol (IP) address associated with the request to a whitelist of IP addresses associated with valid mobile carriers.

12. The system of claim 10, wherein the invalidity determination module comprises an address comparison module configured to compare an internet protocol (IP) address associated with the request to a blacklist of IP addresses associated with fraudulent request sources.

13. The system of claim 10, wherein the invalidity determination module comprises a variable information comparison module configured to compare hidden variable information associated with the request to a whitelist of identification information associated with valid mobile carriers.

14. The system of claim 10, wherein the invalidity determination module comprises a variable information comparison module configured to compare hidden variable information associated with the request to a blacklist of identification information associated with fraudulent request sources.

15. The system of claim 10, wherein the invalidity determination module comprises:

a request referencing module configured to reference other requests received from the source of the request; and a request invalidity determination module configured to determine whether the request is invalid based on the other requests.

16. The system of claim 10, wherein the invalidity determination module comprises:

a mobile carrier identification module configured to identify mobile carrier information associated with the request;

a mobile device identification module configured to identify mobile device information associated with the request; and a request invalidity determination module configured to determine whether the request is invalid based on the mobile carrier information and the mobile device information.

* * * * *